United States Patent [19]

Rousseau

[11] 4,355,921
[45] Oct. 26, 1982

[54] CONTROL DEVICE COMPRISING A SLIDABLE SHAFT WITH A KNOB

[75] Inventor: Jean-Pierre Rousseau, Rambouillet, France

[73] Assignee: U.S. Philips Corporation, New York, N.Y.

[21] Appl. No.: 204,142

[22] Filed: Nov. 5, 1980

[30] Foreign Application Priority Data

Nov. 9, 1979 [FR] France ................ 79 27697

[51] Int. Cl.³ .............................................. F16D 1/06
[52] U.S. Cl. ...................................... 403/316; 403/361; 74/548; 200/340
[58] Field of Search ................ 16/121, 118; 74/548, 74/553; 200/340; 403/361, 316

[56] References Cited

U.S. PATENT DOCUMENTS 3,868,486 2/1975 Nakaya ........................... 200/340 X
4,037,489 7/1977 Morel ................................. 74/548

FOREIGN PATENT DOCUMENTS 955466   1/1957  Fed. Rep. of Germany ...... 403/289
1558875  1/1969  France ............................... 200/340
1317446  5/1973  United Kingdom .................. 16/121
1535032 12/1978  United Kingdom ............... 403/361

Primary Examiner—Andrew V. Kundrat
Attorney, Agent, or Firm—Robert J. Kraus

[57] ABSTRACT

A control device which comprises a slidable shaft provided with a knob. The slidable shaft is gripped by two partitions in the knob, at least one of which is flexible in a plane transversely of the sliding direction of the sliding shaft. Relative displacement of the shaft and the knob is prevented by a fixing ridge in the knob which engages a detent groove in the sliding shaft.

2 Claims, 4 Drawing Figures

CONTROL DEVICE COMPRISING A SLIDABLE SHAFT WITH A KNOB

BACKGROUND OF THE INVENTION

The invention relates to a control device which comprises a slidable shaft which is provided near one end with a knob made of a synthetic resin material. The knob includes a fixing ridge located in a recess and extending transversely of the sliding direction of the slidable shaft, said fixing ridge engaging a detent groove provided in the slidable shaft.

In a known control device of the kind set forth (French Patent Specification No. 1,308,118), the engagement of a detent groove by a fixing ridge serves not only for axial positioning of the knob with respect to the sliding shaft, but also for fixing (clamping) the knob onto the sliding shaft. Because the positioning and fixing functions are both performed by the same engagement, the knob must be secured to the sliding shaft by a comparatively large clamping force. Therefore, mounting and removal of the knob are difficult.

SUMMARY OF THE INVENTION

It is an object of the invention to provide a control device in a large clamping force is not required.

To this end, a control device in accordance with the invention is characterized in that the knob comprises at least one flexible wall which extends parallel to the sliding direction of the sliding shaft and which comprises a hook for latching the shaft into the knob, the bending of the wall occurring in a plane transverse to of the sliding direction of the sliding shaft.

Because a single engagement is not utilized for performing the positioning and clamping functions in a control device in accordance with the invention, a large control force does not require a large clamping force. This is because axial positioning is obtained by engagement of the detent groove by the fixing ridge, while clamping is realized by bending of the wall in a plane transverse to the direction of the control forces.

One embodiment of a control device in accordance with the invention in which the mounting and removal forces are comparatively small is characterized in that the flexible wall is formed by a partition which is arranged inside a recess of the knob and which is unattached to the walls of the knob.

In another embodiment of a control device in accordance with the invention, the fixing ridge which engages the detent groove is situated at least partly on the flexible wall.

BRIEF DESCRIPTION OF THE DRAWING

The invention will be described in detail hereinafter with reference to the accompanying diagrammatic drawing.

DESCRIPTION OF THE PREFERRED EMBODIMENTS

Figure 1:
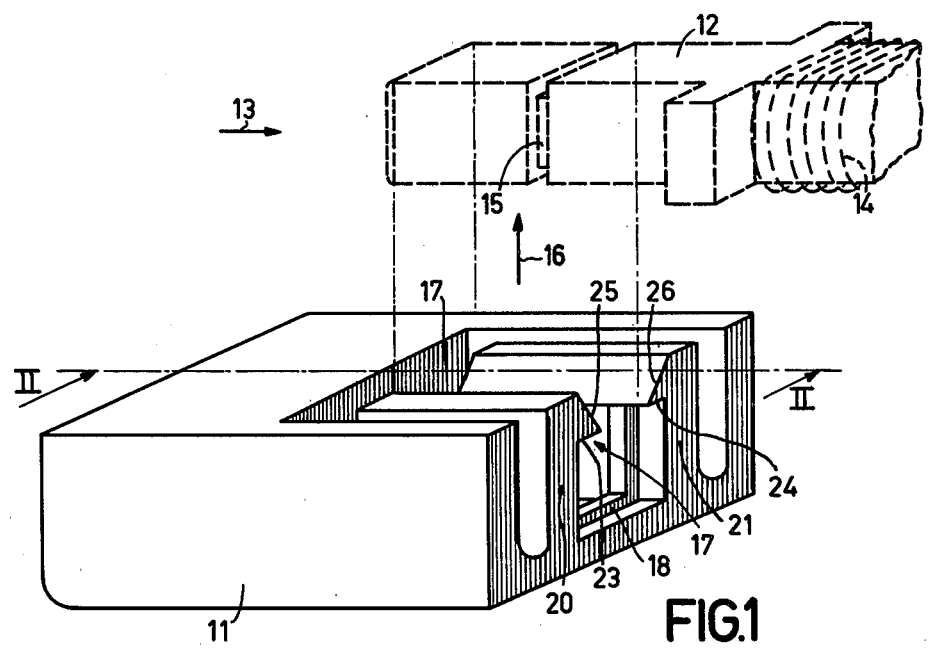
FIG. 1 is a perspective view of a disassembled control device in accordance with the invention.
Figure 2:
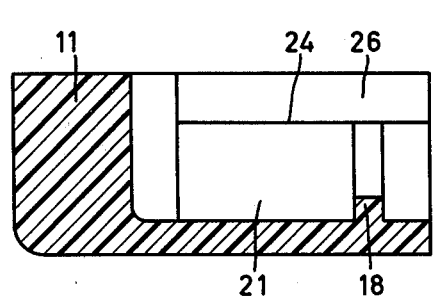
FIG. 2 is a sectional view of a part of the control device of FIG. 1 shown at a reduced scale taken along the line II—II.
Figure 3:
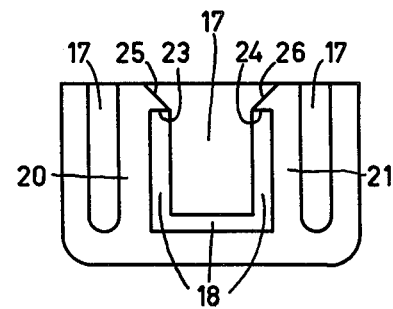
FIG. 3 is a side elevation of a part of the control device of FIG. 1, shown at a reduced scale.

The rectangular knob 11 which is shown in FIG. 1 and which is manufactured by casting or injection moulding of a synthetic resin material is secured on a slidable shaft 12 which has a rectangular cross-section and which is denoted by broken lines. The control device formed by the knob 11 and the slidable shaft 12 can be used, for example, in a known slidable switch (not shown). The sliding direction of the slidable shaft 12 extends in the longitudinal direction of the slidable shaft 12 as is indicated by means of an arrow 3. The motion of the shaft 12 takes place against the force of a helical spring 14 which serves as a reset spring and which is mounted around the shaft. The shaft 12 comprises a detent groove 15 which has a rectangular cross-section and which is situated in a plane transverse to of the sliding direction 13, said groove being made to engage a mating fixing ridge 18 of the knob 11. The knob 11 comprises a rectangular recess 17 in which two flexible partitions (walls) 20 and 21 extend transversely of the outer surface and parallel to the slidable direction of the sliding shaft 12. Near their free ends, the flexible partitions 20 and 21 are provided with hooks 23 and 24, respectively, which the latch shaft 12 into the knob after assembly. The shaft 12 is then preferably lightly clamped between the partitions 20 and 21. During mounting of the knob 11 on the shaft 12 (see arrow 16), the partitions 20 and 21 are laterally bent transversely of the sliding direction 13. The bending stress then occurring is substantially eliminated in the mounted condition. The bottom part of the U-shaped fixing ridge 18 of the fixing device shown in FIGS. 1, 2 and 3 is situated on the bottom of the recess 17, while the legs of the U-shaped ridge are situated on the flexible walls 20 and 21. The plane in which the fixing ridge 18 is situated extends transversely of the sliding direction 13. The ridge 18 fits accurately in the detent groove 15, so that no axial play of the knob 11 occurs. It is not necessary for the ridge 18 to be present on the flexible partitions 20 and 21. In a less compact embodiment, the partitions 20 and 21 may be situated at some distance from each other with respect to the ridge 18 in the sliding direction 13. Near their free end, the partitions 20 and 21 comprise bevelled portions 25 and 26 in order to facilitate mounting.

It will be clear that the magnitude of the control force exerted in the sliding direction 13 has no effect whatsoever on the reliability of the connection between the knob 11 and the slidable shaft 12. Normally speaking, the control force does not have a component in the lateral direction or has only a comparatively small component in that direction. A lateral force component of this kind, however, can never release the sliding shaft 12 from the clamping by the partitions 20 and 21 which grip around the shaft 12 by means of their hooks 23 and 24.

Figure 4:
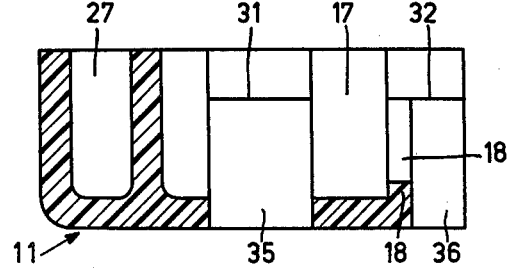
FIG. 4 shows a further version of the part shown in FIGS. 2 and 3.

FIG. 4 shows a cross-section of a further embodiment of a knob 11 used in a control device in accordance with the invention. In order to save material, an additional recess 27 is formed therein. Instead of a single hook 24, two hookds 31 and 32 are provided. Below these hooks are provided openings 35 and 36, respectively, which open into the recess 17. The openings 35 and 36 are intended for the dies of a casting or injection mould.

Even though the control device in accordance with the invention has been described with reference to a preferred embodiment in which there are two flexible partitions 20 and 21 which are symmetrically arranged with respect to the line II—II in FIG. 1, the invention is not restricted thereto. For example, a combination of one non-flexible partition and one flexible partition may be used. It is also to be noted that the invention is not only suitable for use in sliding switches, but in all cases where control of a device is realized by means of a slidable motion. Moreover, strip-shaped or round sliding shafts can be used with an adapted profile of the knob without deviating from the principle of the invention.

What is claimed is:

1. A control device comprising a slidable shaft having a transversely extending detent groove provided near one end, and a knob having a transversely extending fixing ridge extending into a recess provided in the knob for receiving the end of the shaft, said fixing ridge engaging said detent groove when the knob is mounted on the shaft, said knob including at least one flexible wall extending parallel to the direction in which the knob is movable when it is mounted, the flexible wall including a hook for latching the shaft into the knob and thereby securely retaining the ridge in the groove, said flexible wall being formed by a partition which is disposed in the recess.

2. A control device as in claim 1 wherein part of the fixing ridge is on the flexible wall.